Oct. 27, 1970
R. GOODACRE
3,536,353
INDUSTRIAL LIFT TRUCKS
Filed Oct. 25, 1968
2 Sheets-Sheet 1
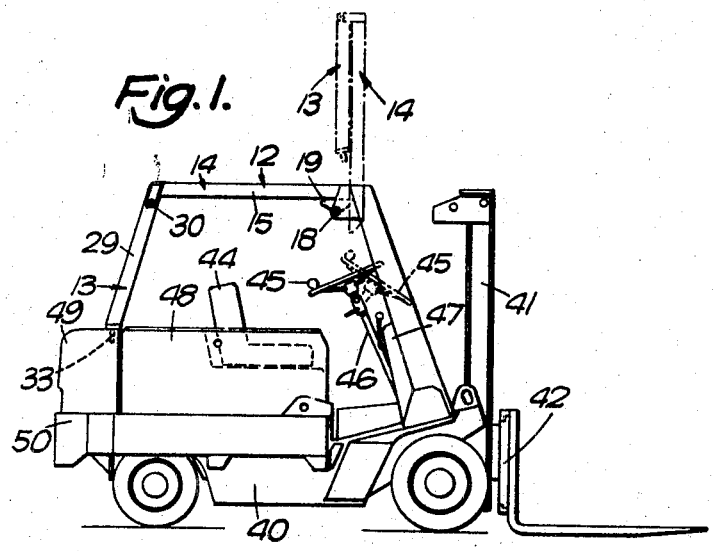
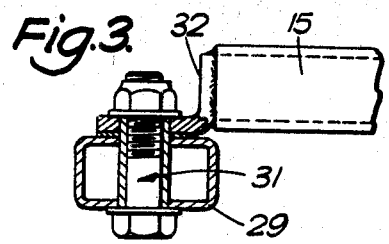
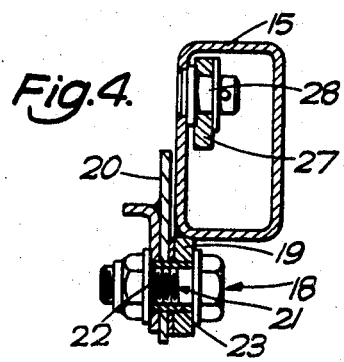
Inventor
Ronald Goodacre
BY
Trish, Richardson & Neave

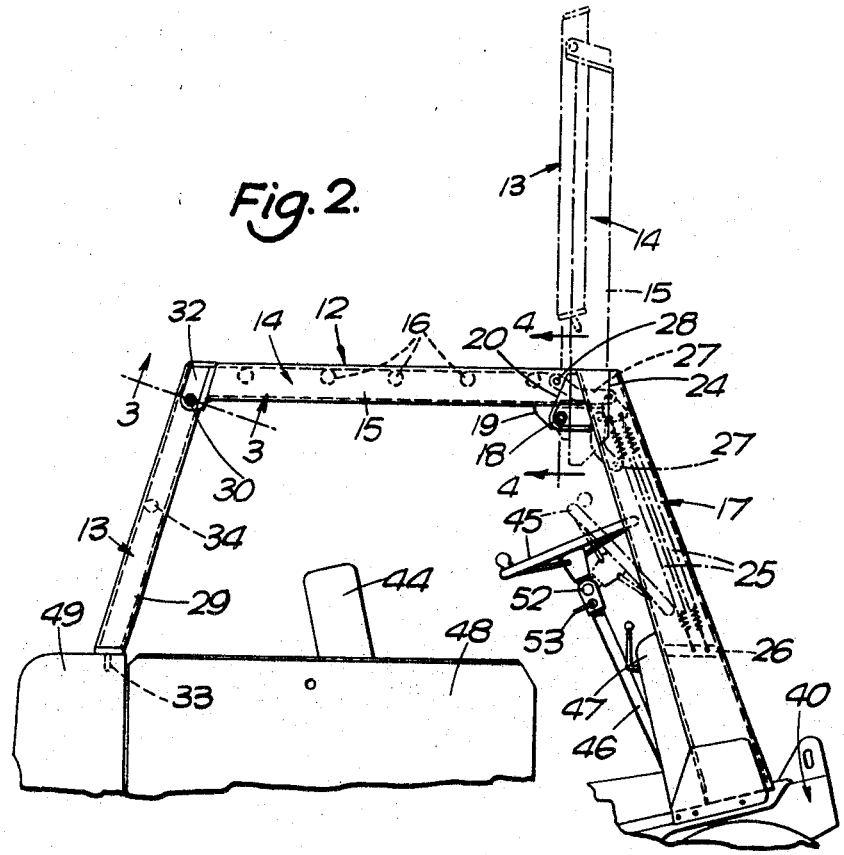

ated Oct. 27, 1970

United States Patent Office 3,536,353

3,536,353
INDUSTRIAL LIFT TRUCKS

Ronald Goodacre, Basingstoke, England, assignor to Lansing Bagnall Limited, Basingstoke, England, a British company
Filed Oct. 25, 1968, Ser. No. 770,608
Claims priority, application Great Britain, Oct. 26, 1967, 49,831/67; Mar. 29, 1968, 15,269/68
Int. Cl. B62d 25/00
U.S. Cl. 296—102                    8 Claims

ABSTRACT OF THE DISCLOSURE

An industrial lift truck has an overhead load guard which is mounted for pivotal movement between an operative position in which it extends over the head of the truck operator and at least part of a member, e.g. a storage battery, supported on the body portion of the truck and an inoperative position in which the member is accessible from above, e.g. for lifting, the load guard comprising a first part which is pivotally mounted at one end to the upper ends of a pair of pillars fixed to the body portion and is designed to extend over the operator's head, and a second part which supports the other end of the said first part when the load guard is in its operative position.

---

This invention relates to industrial lift trucks having overhead load guards to protect the truck operator.

According to the invention an industrial lift truck comprises a body portion, a mast attached to the body portion, a load-lifting carriage mounted on the mast for movement up and down the mast at the front thereof, a member carried on the body portion behind the mast which member is necessarily accessible from above, said body portion providing behind the mast a station for an operator, and a load guard to protect the operator from a falling body, the load guard being supported on a part of the truck for pivotal movement about a transverse axis between an operative position, in which the load guard extends over the head of the operator and at least part of the said member, and an inoperative position in which the said accessibility of the said member is provided characterised in that the overhead load guard comprises a first part pivotally mounted at one end to a pair of spaced apart pillars projecting upwardly from and fixed to the body portion of the truck which first part extends substantially horizontally over the head of the operator when the load guard is in its operative position, and a second part which comprises a substantially vertical support for the other end of the said first part when the load guard is in its said operative position and which is movable with the said first part about the aforesaid transverse axis.

Preferably the said second part of the load guard is pivotally mounted to the said first part to allow the two parts to be folded together when the load guard is in its inoperative position.

It is also preferred that the said first part of the load guard is mounted on the said pillars for pivotal movement between a horizontal operative position and an inoperative position in which the first part extends upwardly from the pillars.

The said member is preferably a storage battery which is vertically removable from the body portion, the said vertical movement being permitted by pivotal movement of the load guard to its inoperative position.

Spring counterbalance means are preferably provided to urge the load guard into its inoperative position, the load guard preferably being retained in its operative position by its own weight.

By way of example, a specific embodiment in accordance with the invention will now be described with reference to the accompanying drawings in which:

FIG. 1 is a side elevation of an industrial truck the load guard fitted to the truck being shown in its operative position (full lines) and also in its folded inoperative position (chain lines);

FIG. 2 is an enlarged side elevation of the load guard and the support pillars, this figure again showing both the operative and inoperative positions of the load guard;

FIG. 3 is a section along line 3—3 in FIG. 2;

FIG. 4 is a section along line 4—4 in FIG. 2; and

FIG. 5 is a rear end elevation of the load guard as shown in FIG. 2.

With reference to FIG. 1, there is shown an industrial truck comprising a body portion 40 having a mast 41 attached to the front of the body portion. A load-lifting carriage 42 is mounted on the mast and a hydraulic jack is provided for raising and lowering the carriage up and down the mast. The mast and its load carriage are thoroughly well known and, as they do not form part of this invention, need not be further described. As shown, the mast is shorter than is normally provided on a lift truck so that the lift truck may be used on board ship. However, the invention is not restricted to a truck having a short mast.

Behind the mast 41 there is an operator station comprising an operator's seat 44 and a steering wheel 45, the steering wheel being mounted on the upper end of a steering shaft 46 located behind the scuttle 47 on which the other operator controls are mounted.

Mounted on the body portion of the truck and generally behind the operator station, there is a storage battery 48 for supplying current to the electric motors provided for driving the truck and for operating any auxiliary mechanism, e.g. the motor for operating the pump which delivers oil to the lift jack. Also mounted on the body portion, to the rear of the battery, there is a tailweight 49 which acts to counterbalance the tipping effect of any load being carried. Both the battery 48 and the tailweight 49 are supported by a tray 50 which is itself carried by the body portion of the truck in a manner which precludes lateral or longitudinal movement of the tray relatively to the body portion. However, suitable means, i.e. lifting eyes, are provided on the tray so that it may be lifted vertically, together with the tailweight and the battery, and further lifting eyes are provided on the battery, e.g. sockets in the sides of the battery so that the battery may be lifted vertically, by itself.

The provision of an overhead load guard 12 will now be described, the load guard being provided to protect the operator from a falling body, e.g. a load from the load-lifting carriage and being the subject of this invention. With reference to the drawings, the load guard straddles the space, which includes the operator station, between the scuttle 47 and the tailweight 49 and comprises a first part 14, which is horizontal when the load guard is in its operative position (shown in full lines in FIG. 1), and a second part 13 which comprises a generally vertical support part when the load guard is in its operative position. For convenience, these parts 14, 13 will be described as horizontal and vertical parts respectively. The horizontal part 14 comprises side rectangular tubular members 15 extending longitudinally of the truck and joined together by five transverse rungs 16. The front ends of the side members are pivotally connected at 18 to the upper ends of two pillars 17 upstanding from and fixed to the body portion of the truck, one on either side of the scuttle 47. Each pillar has a rectangular tubular cross-section having the inside rear corner, with respect to the truck, removed.

The pivotal connection 18 on each side of the load guard comprises a bolted connection 21 (see FIG. 4)

between a lug 19 welded to the underside of the respective side channel member 15 and a bracket 20 extending rearwardly from the upper end of the associated pillar 17. The shank 22 of each bolt is surrounded by a sleeve 23. The adjacent end of each side member 15 is interengaged with the removed corner of the associated pillar whereby the part 14 of the load guard may be pivoted forwardly and upwardly from its horizontal or operative position (shown in full lines in FIGS. 1 and 2) into a vertical or inoperative position (shown in chain lines in FIGS. 1 and 2). The vertical position of the part 14 is determined by the side channel members engaging a rearward facing vertical surface 24 provided by a cut-away portion of the upper end of each pillar 17, this surface 24 thereby constituting a stop to prevent further pivotal movement of the part 14 of the load member in a clockwise direction as viewed in FIGS. 1 and 2.

The part 14 of the load guard is urged towards and retained in its vertical or inoperative position by means of two springs 25 extending longitudinally of and inside each pillar 17, the springs becoming operative when the load guard has been moved, manually, a part way towards is inoperative position. The lower end of each spring is secured to a member 26 fixed within the respective pillar. The upper end of each spring is secured to one end of a cranked link 27 which projects from the adjacent end of the respective side member 15 and which is mounted (see FIG. 4) by a pin 28 to the side member for pivotal movement about a transverse axis. When the load guard is in its operative position, the said transverse axis of the pins 28 lies above the transverse axis of the pivotal connections 18 of the load guard to the pillars 17, the end of the side member through which each link 27 projects comprises the forward end of an extension of the side member which projects forwardly of the axis of the respective pivotal connection 18, and the respective link 27 abuts against the lower inside surface of this extension (see FIG. 2). The spring force is thus applied to the extensions through the link abutments with the extensions. Nevertheless, the weight of the load guard is sufficient to retain it in its operative position. However, when the horizontal part 14 is lifted towards its inoperative position, the links separate from their abutting relation with the extensions and the line of action of each spring is between the respective link and the lower end of the spring.

Th upper end of the above-mentioned generally vertical support part 13 of the load guard similarly comprises two side members 29, joined together by a transverse rung 34. Each of these side members 29 is of rectangular tubular section and is pivotally connected at 30 to the rear end of one of the side members of the horizontal part 14.

As shown in FIG. 3, each pivotal connection 30 comprises a bolt connection 31 between the respective member 29 and one leg of an angle bracket 32, the other leg of the bracket being welded to the adjacent end of the associated side member 15 of the horizontal part 14.

The lower end of each side member 29 of the support part 13 is closed and is provided with a downwardly projecting peg 33 for reception in a socket provided in the top surface of the tailweight 49. The load guard is thereby located and supported, at its rear end, by the tailweight. As best shown in FIG. 5, there is provided, on each side of the load guard, a swivel catch 51 to releasably hold each peg 33 in its respective socket in the tailweight, during use of the truck. These catches may be readily released to allow the load guard to be moved upwardly into its inoperative position, the pivotal connections 30 allowing the support part 13 to be folded against the underside of the horizontal part 14.

As stated above, the steering wheel 45 is mounted on the upper end of the steering shaft 46. This mounting for the steering wheel is such that it allows the steering wheel to be pivoted to a stowage position (shown in chain lines) about a horizontal transverse axis relatively to the steering shaft. To this end, the upper end of the steering shaft is forked and carries a horizontal transverse spindle 52 on which the central boss of the steering wheel is mounted. A removable locking pin 53 is provided to interconnect the steering shaft and the steering wheel to retain the wheel in its normal steering position (as shown in full lines).

With the load guard raised into its inoperative position and the steering wheel pivoted into its stowage position, the tailweight, battery and support tray, or the battery alone, may be removed vertically from the remainder of the truck.

The feature of the tray 50 for supporting the battery 48 and the tailweight 49 is fully described and claimed in the specification of our co-pending British patent application No. 48,804/67.

The invention is not restricted to the specific details of the embodiment described above. For example, the above described horizontal part 14 may be moved downwardly, instead of upwardly, into its inoperative position, the part 13 of the load guard lying between the part 14 of the load guard and the pillars 17.

Also, the invention includes constructions of industrial lift truck which include a load guard that is movable to its inoperative position to permit another part or other parts of the truck carried by the body portion behind the mast, other than the battery, to become more accessible. Moreover, the invention includes constructions of truck which are driven, not by an electric motor, but by an engine. In such a case, it may be desirable to provide the truck with a load guard which is pivotable in the manner described above so that, for example, a cowling may be removed to render the engine more accessible for servicing.

I claim:
1. An industrial lift truck comprising a body portion, a mast attached to the body portion, a load-lifting carriage mounted on the mast for movement up and down the mast at the front thereof, a member carried on the body portion behind the mast which member is necessarily accessible from above, said body portion providing behind the mast a station for an operator, and a load guard to protect the operator from a falling body, the load guard comprising a pair of spaced-apart pillars fixed to the body portion of the truck and projecting upwardly therefrom to a level above the head of an operator at the operator's station, a first part which is pivotally connected to the upper ends of the pillars and extends substantially horizontally and rearwardly from the upper ends of the pillars and over the head of the operator when the load guard is in its operative position, and a second part pivotally connected at one end to the rear end of the said first part and releasably mounted at its free end on the truck body comprising a support for the first part when the load guard is in its said operative position, the first part being pivotable forwardly extending upwardly from the upper ends of said pillars with said second part folded thereagainst when the load guard is in its inoperative position.

2. A truck as claimed in claim 1 in which the said member is a storage battery which is vertically removable from the body portion, the said vertical movement being permitted by pivot movement of the load guard to its inoperative position.

3. A truck as claimed in claim 1 in which the load guard is urged towards its operative position by its own weight.

4. A truck as claimed in claim 1 in which spring counterbalance means are provided to urge the load guard into its inoperative position.

5. A truck as claimed in claim 4 in which the spring means are effective to move the load guard to its said inoperative position when the load guard has been moved a part way towards that said position.

6. A truck as claimed in claim 1 in which the said second part of the load guard is provided with downwardly extending pegs for engagement in sockets provided in the top surface of a counterbalance weight carried on the body portion of the truck, which counterbalance weight is on the remote side of the battery from the mast of the truck.

7. A truck as claimed in claim 6 in which catch means are provided to securely hold the said pegs of the said second part of the load guard within the sockets provided in the top surface of the counterbalance weight.

8. An industrial lift truck comprising a body portion, a mast attached to the body portion, a load-lifting carriage mounted on the mast for movement up and down the mast at the front thereof, a member carried on the body portion behind the mast which member is necessarily accessible from above, said body portion providing behind the mast a station for an operator, and a load guard to protect the operator from a falling body, the load guard being supported on a part of the truck for pivotal movement about a transverse axis between an operative position, in which the load guard extends over the head of the operator and at least part of the said member, and an inoperative position in which the said accessibility of the said member is provided, characterised in that the load guard comprises a first part pivotally mounted at one end to a pair of spaced-apart pillars projecting upwardly from and fixed to the body portion of the truck for pivotal movement between a horizontal operative position and an inoperative position in which the first part extends upwardly from the pillars, which first part extends substantially horizontally over the head of the operator when the load guard is in its operative position, a second part pivotally connected at one end to the rear end of said first part and releasably mounted at its free end on the truck body comprising a substantially vertical support for the other end of the said first part when the load guard is in its said operative position and which is movable with the said first part about the aforesaid transverse axis, and spring counterbalance means to urge the load guard into its inoperative position, the said first part having an extension which projects forwardly from the said transverse pivotal axis of the load guard when the first part is in its horizontal operative position, said spring means comprising, for each pillar, at least one spring extending longitudinally of the pillar, attached at its lower end to the pillar and attached at its upper end to a link which is pivoted to the first part at a point which lies above the said transverse axis when the first part is in its operative position, the said link then abutting against the said extension whereby the spring force is applied to the extension through the link abutment with the extension, and as the first part pivots upwardly towards its inoperative position the link separates from its abutting relation with the extension and the line of action of the spring is then between the lower end of the spring and the link connection to the first part.

References Cited
UNITED STATES PATENTS

| | | | |
|---|---|---|---|
| 1,236,207 | 8/1917 | Oliver | 296—108 |
| 2,911,232 | 11/1959 | Hasting et al. | 296—102 |
| 2,919,156 | 12/1959 | Dodge | 296—107 |
| 3,289,871 | 12/1966 | LaTourneau et al. | 296—102 |

BENJAMIN HERSH, Primary Examiner

R. R. SONG, Assistant Examiner

U.S. Cl. X.R.

280—150